(12) United States Patent
Rosemann

(10) Patent No.: US 7,401,387 B2
(45) Date of Patent: Jul. 22, 2008

(54) CLIP FOR JOINING STRUCTURAL PARTS AND FASTENING SYSTEMS USING A CLIP

(75) Inventor: Frank Rosemann, Münzenberg (DE)

(73) Assignee: Newfrey LLC, Newark, DE (US)

( * ) Notice: Subject to any disclaimer, the term of this patent is extended or adjusted under 35 U.S.C. 154(b) by 106 days.

(21) Appl. No.: 11/411,095

(22) Filed: Apr. 26, 2006

(65) Prior Publication Data

US 2006/0248691 A1   Nov. 9, 2006

(30) Foreign Application Priority Data

Apr. 27, 2005   (DE) .................. 10 2005 020 011

(51) Int. Cl.
*F16B 5/06* (2006.01)

(52) U.S. Cl. .............. 24/289; 24/666; 24/669

(58) Field of Classification Search ........... 24/289–295, 24/297, 458, 453, 666, 667, 669, 701, 702; 411/508–511, 182, 480, 533, 902, 903, 349, 411/173–175, 112, 913; 403/397, 408.1, 403/326; 52/716.7, 718.06, 716.5, 716.6, 52/716.8, 718.03, 704; 174/138 D; 296/146.7, 296/39.1, 214
See application file for complete search history.

(56) References Cited

U.S. PATENT DOCUMENTS

| | | | | |
|---|---|---|---|---|
| 2,049,869 | A | * | 8/1936 | Rohrs .......................... 24/702 |
| 3,239,988 | A | * | 3/1966 | Meyer ..................... 52/718.04 |
| 4,860,409 | A | * | 8/1989 | Bering et al. .................. 24/289 |
| 6,347,438 | B1 | * | 2/2002 | Fildan et al. .................. 24/662 |
| 7,017,239 | B2 | * | 3/2006 | Kurily et al. .................. 24/297 |

FOREIGN PATENT DOCUMENTS

| | | |
|---|---|---|
| EP | 1 460 322 A1 | 9/2004 |
| EP | 1 496 270 A2 | 1/2005 |
| GB | 2 118 612 A | 4/1982 |

* cited by examiner

*Primary Examiner*—James R Brittain
(74) *Attorney, Agent, or Firm*—Ajay Gambhir; Stephen R. Valancius

(57) ABSTRACT

A clip for joining structural parts comprises a disk having an inner portion and an outer portion forming a rim about the inner portion. The inner portion has a depression with a recess extending downwardly from the depression and provided with a laterally-extending opening for receiving a mounting member, such as a pin.

15 Claims, 2 Drawing Sheets

CLIP FOR JOINING STRUCTURAL PARTS AND FASTENING SYSTEMS USING A CLIP

CROSS-REFERENCE TO RELATED APPLICATION

This application claims the benefit of German Patent Application No. 102005020011.7 filed Apr. 27, 2005, incorporated herein by reference.

BACKGROUND OF THE INVENTION

This invention relates to a clip for joining structural parts and to fastening systems using a clip. Various types of clips are widely used to join structural parts, such as inner and outer vehicle panels. Since the clips are used in such large numbers, simplicity, ease of use, and cost are of paramount importance.

BRIEF DESCRIPTION OF THE INVENTION

In the present invention an improved clip comprises a disk with an inner portion and an outer portion that forms a rim about the inner portion. The inner portion forms a depression with a sunken recess that has a laterally-extending insertion opening for receiving a mounting member. The clip and the mounting member can be easily assembled by hand and are constructed to join structural parts securely.

In a preferred embodiment, the mounting member is a pin with a head having an underside that engages a shoulder in the recess. The disk has a spring finger adjacent to the insertion opening, constructed and disposed to prevent withdrawal of the pin from the disk after its insertion. The disk also has resilient holding fingers that extend away from the inner portion of the disk and downward from the rim to engage one of the structural parts to be joined. Pressure on the resilient holding fingers by virtue of their engagement with a structural part urges the shoulder in the recess into engagement with the underside of the head of the pin.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
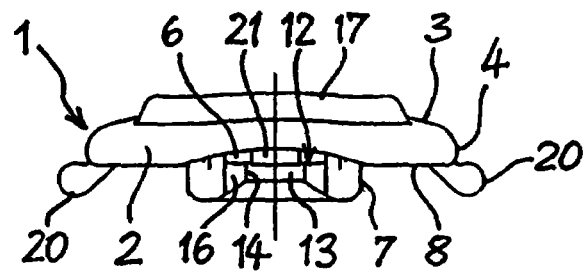
FIG. 1 is a side elevation view of a clip according to the invention.
Figure 2:
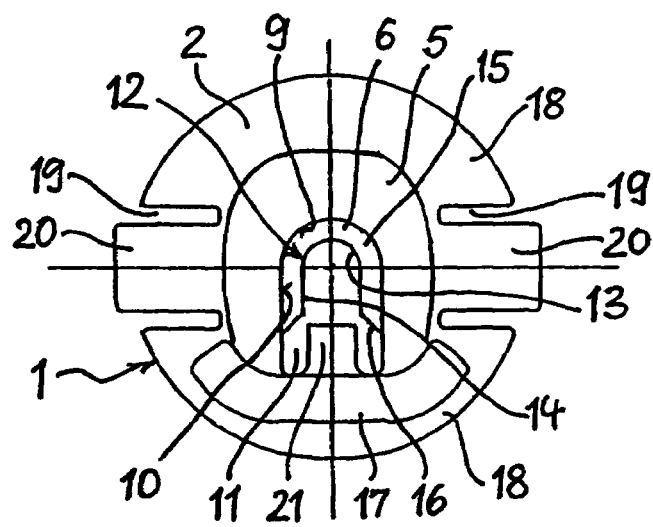
FIG. 2 is a top plan view of the clip.

As shown in FIGS. 1 and 2, a clip 1 in accordance with the invention comprises a generally circular disk 2, which has a slightly arched upper side 3 with a rounded edge 4. The disk may be formed of molded plastic or of metal, for example. For ease of description, it is assumed that the disk is arranged horizontally with a longitudinal axis arranged vertically, but this orientation can vary.

The disk 2 has inner and outer portions, the outer portion forming a rim 18 about the inner portion. The rim extends radially outward from the inner portion of the disk 2 and curves slightly downward. The inner portion has a shallow depression 5 with a sunken recess 6 open at the bottom. The recess 6 is of smaller external extent than the depression 5 and thus occupies a relatively small part of the inner portion of the disk 2.

The recess 6 is defined by a U-shaped wall 7 located on the underside 8 of the disk and projecting downwardly. The recess 6 has a cylindrical section 9 and two parallel plane sections 10, between which a laterally-extending insertion opening 11 is formed. At a lower region of the recess 6, a U-shaped holding region 12 provides a shoulder 15 disposed to engage cooperative surfaces of a mounting member (later described). The shoulder 15 of the holding region 12 is defined by a cylindrical section 13 concentric with cylindrical section 9, and two sections 14 parallel with sections 10. The shoulder 15 forms a planar contact surface perpendicular to the longitudinal axis of the disk. Diverging ramps 16 form a tapered lead-in to the shoulder 15. In the form shown, the longitudinal axis of the disk is also the cylindrical axis of sections 9 and 13 at the center of the disk.

The disk 2 has a bead 17 that projects upwardly from the upper surface of the rim 18. As later described, the bead 17 can assist in assembling the disk 2 with a mounting member.

The rim 18 of the disk 2 has cuts 19 that define diametrically opposed resilient holding fingers 20 that extend outward from the depression 5 and downward from the rim. The holding fingers 20 project outwardly beyond adjacent portions of the rim 18 to form a yielding support that presses against a structural part to be fastened with the clip.

A resilient locking finger 21 projects inwardly from the rim 18 into the insertion opening 11. The underside of the locking finger 21 provides a ramp surface 22, which cooperates with a mounting member as the mounting member is inserted laterally inward through the insertion opening 11 into the holding region 12, as described hereinafter.

Figure 3:
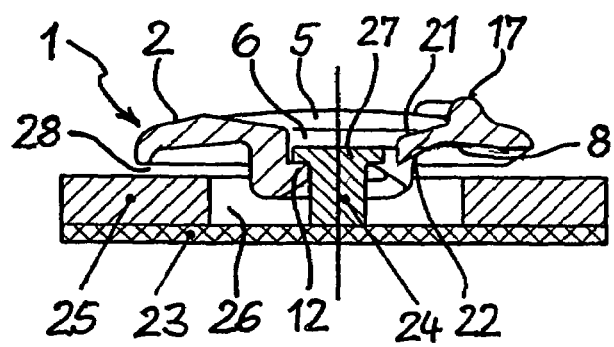
FIG. 3 is a cross-section of a fastening system according to the invention, running in the direction of assembly of the clip and the mounting member.
Figure 4:
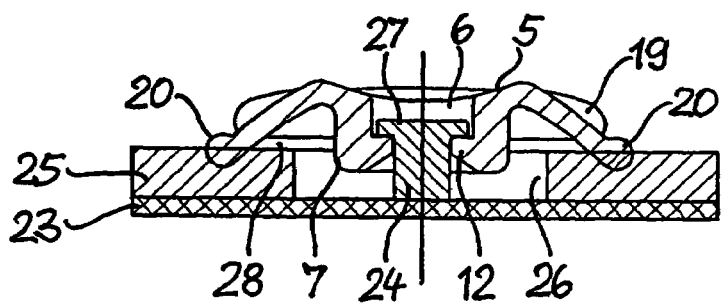
FIG. 4 is a cross-section of the fastening system of FIG. 3, running transverse to the direction of assembly.

A first fastening system which uses the clip 1 of the invention is shown in FIGS. 3 and 4. In this fastening system, a metal pin 24, T-shaped in longitudinal cross-section and circular in transverse cross-section, extends upwardly from a first structural part 23, which may be a sheet of metal, for example a body part of a vehicle, to which the pin 24 is welded. A second structural part 25, for example a covering part, is fastened to the pin 24 with the aid of the clip 1. The second structural part 25 has an opening 26 into which the pin 24 is inserted. The pin is long enough to extend beyond the upper surface of the structural part 25. The opening 26 is wide enough to permit the wall 7 of the clip to be received in the opening with sufficient clearance to accommodate positional differences of the structural part 25 with respect to the pin 24.

In FIGS. 3 and 4, the clip 1 is shown assembled with the pin 24. Here, the pin 24 is in the holding region 12, and the underside of the head 27 engages the shoulder 15 of the holding region 12. The locking finger 21 lies directly opposite the edge of the head 27 and holds the head firmly in the recess 6. The holding fingers 20 rest with pre-tension on the structural part 25 and hold the fastening system free from play. A small interspace 28 is present between the edge of the disk 2 and the opposing surface of the structural part 25, which serves to facilitate the assembly operation.

In order to assemble the clip 1 with the pin 24, the clip 1 is placed with its underside 8 toward the structural part 25.

Then, while the clip 1 is pressed downward against the structural part 25, the clip is pushed by hand, with the aid of a thumb or a finger in the depression 5, to move the clip in a direction transverse to the longitudinal axis of the pin 24. The head 27 of the pin is engaged with the ramp surface 22 of the resilient locking finger 21, in order to move the locking finger away from its initial position as the pin 24 is inserted in the insertion opening 11. When the pin 24 has been fully moved into the recess 6, so that its longitudinal axis coincides with the longitudinal axis of the disk 2, the underside of the head 27 of the pin 24 is disposed to engage the shoulder 15. After insertion of the pin 24 through the insertion opening 11, the locking finger springs back to its initial position, where it is disposed relative to the head 27 of the pin 24 to prevent withdrawal of the pin through the insertion opening 11.

By virtue of the sunken position of the holding region 12 in the depression 5, the pin 24 can be slid through the insertion opening 11 into the holding region 12 while a thumb or finger in the depression 5 does not significantly touch the head 27 of the pin 24. Thus the assembly movement is not hindered by pressure of the thumb or finger on the head of the pin. The bead 17 has the ability to better transmit the pushing force of a thumb or a finger to the clip, providing additional support for the tip of the thumb or finger.

As shown in FIG. 4, resilient holding fingers 20 engage the structural part 25 to equalize dimensional differences of the fastening system and to provide a defined contact pressure by which the clip is supported on the structural part 25. The reactive force of the structural part 25 on the spring fingers 20 ensures engagement of the underside of the head 27 of the pin 24 with the shoulder 15. If the structural part 25 is a cover part having some degree of softness, the tips of the spring fingers 20 may press into the opposing surface of structural part 25, as shown in FIG. 4.

The configuration of the rim 18 of the disk 2 contributes to the strength of the disk and permits the formation of reinforcing ribs (not shown) on its underside. In addition, this design makes for a better transition to the surface of structural part 25 and reduces the risk of damage due to the impact of gravel or the like when the clip is placed on outer surfaces of vehicles, for example.

Figure 5:
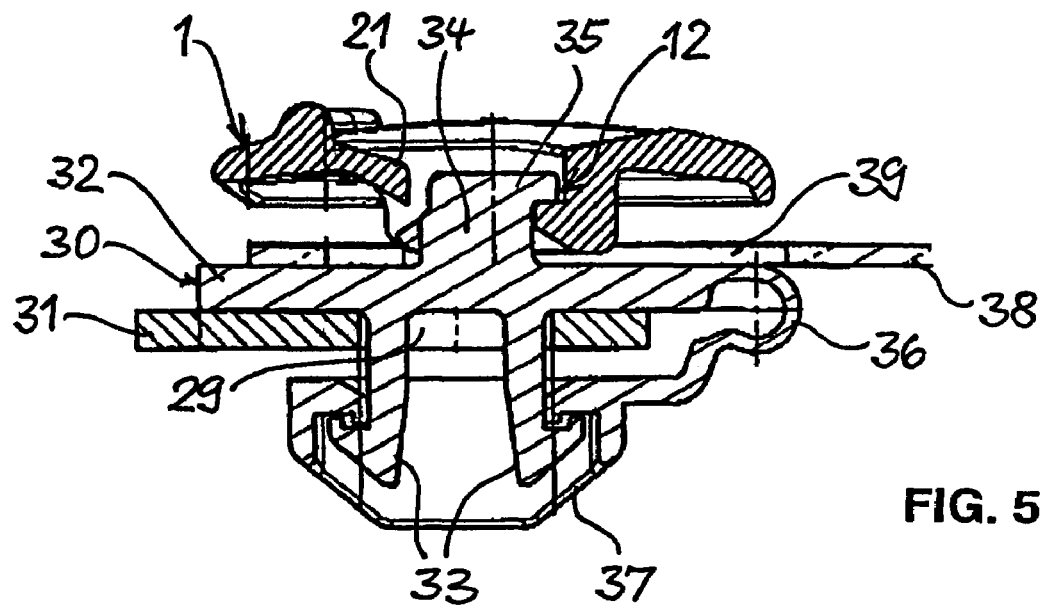
FIG. 5 is a cross-section of a second fastening system according to the invention, running in the direction of assembly of the clip and the mounting member.
Figure 6:
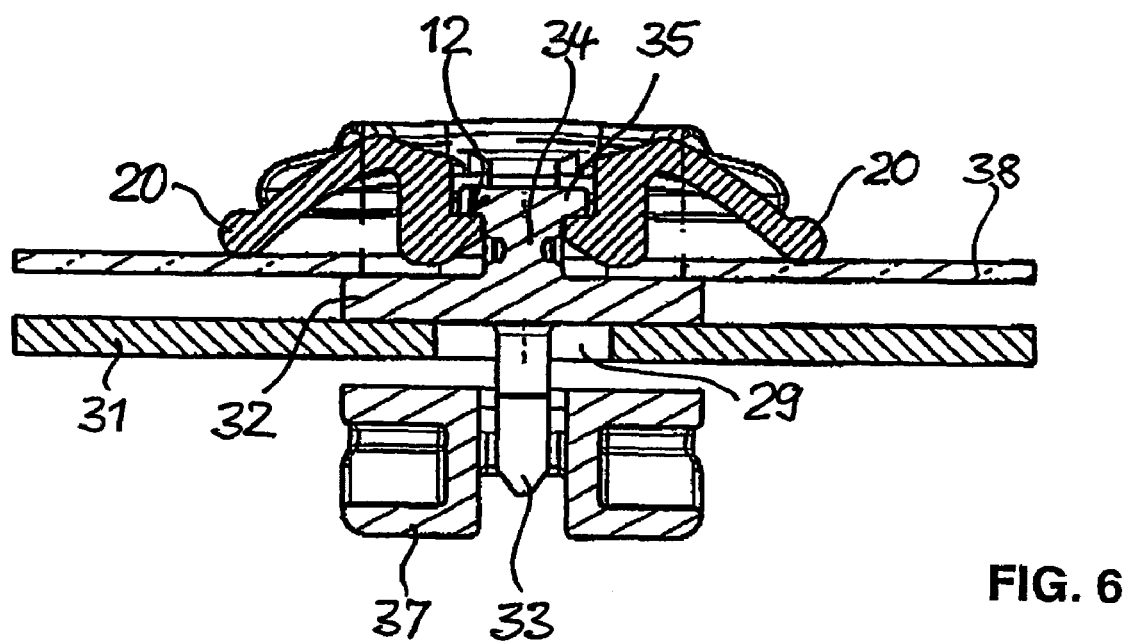
FIG. 6 is a cross-section of the second fastening system according to the invention, running transverse to the direction of assembly.

FIGS. 5 and 6 show a second fastening system using a clip of the invention for joining three structural parts. In this embodiment, a first structural part is a fastening element 30 that is to be joined to a second structural part 38 and to a third structural part 31, for example a covering plate. The fastening element 30 has a supporting plate 32, which, on one side has catches 33 and on the other side a pin 34 with a head 35. A latching element 37 is formed on the supporting plate 32 via a bending hinge 36. The fastening element 30 may be an integral molded plastic piece, for example.

The catches 33 of fastening element 30 are inserted into an opening 29 in the structural part 31 and engage cooperative portions of latching element 37 to trap the third structural part 31 between the first structural part 30 and the latching element 37. In practice, part 31 may be a felt-like material, for example. In FIGS. 5 and 6, the third structural part 31 is shown contacting the supporting plate 32 and spaced from the latching element 37, but the thickness of the part 31 may vary in practice, and it is not necessary that structural part 31 contact supporting plate 32. The clearance between plate 32 and latching element 37 is sufficient to accommodate a range of thickness of part 31.

With the aid of the pin 34 and the clip 1, the structural part 30 is fastened to the second structural part 38, for example a sheet-metal part of a vehicle body. For this purpose, the pin 34 is inserted into an opening 39 in the structural part 38 from one side. Then from the opposite side, the clip 1 is pushed onto the pin 34 by hand, along the surface of the structural part 38 until the pin 34, with its head 35, has reached an assembly end position, in which the pin 34 is held firmly in the holding region 12 of the clip 1 by the locking finger 21, as described in connection with the first fastening system shown in FIGS. 3 and 4. In the assembly end position, the holding fingers 20 rest with pre-tension on the structural part 38, due to which the latter is pressed on the supporting plate 32 of the fastening element. An opposing force is applied via the holding region 12 on the head 35 of the pin 34.

While preferred embodiments of the invention have been shown and described, changes can be made without departing from the principles and spirit of the invention, the scope of which is defined in the accompanying claims. As indicated earlier, the orientation of the clip of the invention is not restrictive. It depends on the orientation of the structural parts to be joined. Thus the use of terms such as "upper" or "lower" is not intended to be restrictive.

What is claimed is:

1. A clip for joining structural parts, comprising a disk with inner and outer portions, the outer portion forming a rim of the disk about the inner portion, the inner portion having a depression shaped to receive a portion of a thumb or finger to press the clip toward a structural part, the inner portion having a recess defined by a wall that extends downwardly from a portion of the depression along a longitudinal axis of the disk, the wall being constructed to receive and hold a mounting member on a structural part and having a laterally-extending insertion opening for insertion of the mounting member.

2. A clip according to claim 1, wherein the disk has a resilient locking finger extending inwardly from the rim into the insertion opening and constructed so as to retract from an initial position to permit insertion of the mounting member into the insertion opening, and then to return to the initial position to prevent withdrawal of the mounting member from the insertion opening.

3. A clip according to claim 2, wherein the rim has a bead on an upper surface adjacent to the locking finger.

4. A clip according to claim 1, wherein the wall defining the recess extends downwardly beyond the rim.

5. A clip according to claim 1, wherein the rim has a pair of resilient fingers extending away from the inner portion of the disk and downwardly from the rim.

6. A clip according to claim 1, wherein the wall defining the recess is substantially U-shaped in a plane perpendicular to the longitudinal axis of the disk.

7. A clip according to claim 1, wherein the wall defining the recess has a shoulder in a plane substantially perpendicular to the longitudinal axis of the disk for engaging cooperative surfaces of the mounting member.

8. A clip according to claim 7, wherein the shoulder is substantially U-shaped and is defined between concentric substantially cylindrical portions centered on the longitudinal axis of the disk and substantially parallel portions extending from the cylindrical portions toward the rim of the disk.

9. A clip according to claim 8, wherein the shoulder has transitional portions at ends of the parallel portions facing the rim.

10. A clip for joining structural parts, comprising a disk with inner and outer portions, the outer portion forming a rim of the disk about the inner portion, the inner portion having a wall extending downwardly below the rim and defining a recess with a laterally-extending insertion opening in the wall below the rim for insertion of a mounting member and having a holding region in the recess for retaining the mounting member in the recess, and wherein the outer portion has a pair of resilient fingers extending away from the inner portion of the disk and downwardly from the rim.

11. A clip according to claim 10, wherein the holding region has a shoulder defining a surface disposed to engage a cooperative surface of a mounting member.

12. A clip according to claim 11, wherein the clip has a locking element constructed and disposed to maintain a mounting member in the holding region after insertion in the insertion opening.

13. A fastening system with a clip according to claim 1 or claim 10, wherein a first structural part has said mounting member that comprises a pin projecting from said structural part through an opening in a second structural part, and wherein the pin is held in said recess after insertion of the pin through said insertion opening.

14. A fastening system according to claim 13, wherein said second structural part is held between said first structural part and said clip.

15. A fastening system according to claim 14, wherein said first structural part has catches that project through an opening in a third structural part and are latched to a latching element connected to and extending from said first structural part.

* * * * *